United States Patent Office 3,274,214
Patented Sept. 20, 1966

3,274,214
AROMATIC CARBONATES
Robert J. Prochaska, Stockbridge, Mass., assignor to General Electric Company, a corporation of New York
No Drawing. Filed Dec. 26, 1962, Ser. No. 247,292
4 Claims. (Cl. 260—340.2)

This invention relates to aromatic carbonates and more particularly relates to the preparation of novel and useful cyclic aromatic carbonate polymers.

Cyclic carbonates have been known and studied for many years since ethylene carbonate was first prepared by Nemirowski in 1883 [J. Prakt. Chem. (2), 28, 439 (1883)]. This stable, crystalline solid has been definitely established to be the 5-membered ring compound. In 1898, Einhorn [Ann. 300, 135 (1898)] prepared a cyclic carbonate from catechol and phosgene. This simple 5-membered cyclic aryl carbonate and similar compounds prepared from substituted catechols are only cyclic aryl carbonate monomers reported in the literature. They are, however, highly stable compounds incapable of being polymerized to form high molecular weight polycarbonates. In 1930, Carothers and Van Natta [JACS 52, 314–26 (1930)] prepared the 6-membered cyclic trimethylene carbonate and succeeded in isolating the cyclic dimeric tetramethylene carbonate. This work was continued by Carothers, Dorough and Van Natta [JACS 54, 761–772 (1932)] in a study of the reversible polymerization of 6-membered cyclic esters, including cyclic aliphatic carbonates. They had concluded at the time that any attempt to prepare cyclic esters having more than 6 atoms in the ring from open chain polymeric compounds led to linear polymers. In 1933, Hill and Carothers [JACS 55, 5031–39 (1933)] succeeded in preparing many cyclic aliphatic carbonates by depolymerizing the corresponding polymers under a vacuum. However, they were unable to prepare any monomeric cyclic carbonates having 7 or 8 atoms in the ring by their depolymerization technique. The preparation of cyclic tetrameric carbonates by condensing p-hydroxy bis-phenols with their chloroformate derivatives is described by Schnell and Bottenbruch in Die Makromolekulare Chemie 57, 1–11 (1962). However, the tetramers are the only cyclic carbonate materials reported by the authors who state that they were unable to prepare any monomeric or dimeric cyclic aromatic carbonates.

In my copending application, Serial No. 161,306, filed December 21, 1961, now U.S. Patent No. 3,221,025, granted Nov. 30, 1965, and assigned to the same assignee as the present invention, there is disclosed a new class of aromatic cyclic carbonate monomers which may be polymerized to provide high molecular weight aromatic carbonate polymers. Generally speaking, these cyclic carbonate monomers are 7 and 8 membered ring compounds corresponding to the general formula (I)

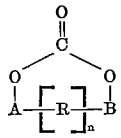

wherein A and B are aromatic radicals, R is attached to A and B ortho relative to the respective oxygen atoms and is selected from the group consisting of an alkylidene group, a sulfone group, a carbonyl group, a sulfoxy group, sulfur, and oxygen; and $n$ is a whole number from 0 to 1. Such aromatic cyclic carbonate monomers may be easily and conveniently converted to high molecular weight carbonate polymers by heating these cyclic monomers in the presence of a catalyst, such as an alkali metal or an alkali metal hydroxide, for example. Other suitable catalyst which may be used, as well as specific methods for polymerizing these aromatic cyclic carbonate monomers to provide high molecular weight aromatic polymers, are disclosed in my above referred to copending application.

In my copending application Serial No. 184,940, filed April 4, 1962, now U.S. Patent No. 3,137,706, granted June 16, 1964, and also assigned to the assignee of the present invention, there is disclosed a new process for preparing the cyclic carbonate monomers of Formula I above. Briefly stated, that process comprises heating, under vacuum, a carbonate polymer containing recurring structural units of the formula (II)

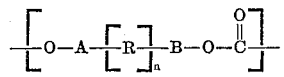

where A, B, R, and $n$ all have the meanings given above, to distill the above described cyclic carbonate monomer.

As far as I am aware, cyclic aromatic carbonate dimers and trimers have heretofore not been prepared. In accordance with my invention, however, cyclic aromatic carbonate dimers and trimers have been prepared from which the high molecular weight linear aromatic polycarbonates may be produced. These linear polymers are high melting, thermally stable materials which have gained prominence in the plastics industry. Therefore, by means of my invention, the scope of cyclic carbonate materials available for use in the art has been extended.

Briefly stated, the novel and useful cyclic aromatic carbonate dimers and trimers of the invention correspond to the general formula (III)

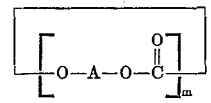

where $m$ is a whole number from 2 to 3, —A— is

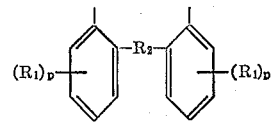

where $m$ is 2; and —A— is

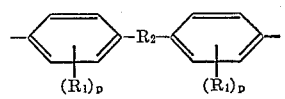

where $m$ is 3; $R_1$ is selected from the class consisting of halogen, such as chlorine and bromine; and alkyl radicals such as, for example, methyl, ethyl, propyl, butyl, p-tert-butyl; $R_2$ is an alkylidene group such as, for example, methylene, ethylidene, propylidene; and $p$ is a whole number from 0 to 2.

In accordance with one aspect of my invention the cyclic aromatic dimers and trimers falling within the scope of Formula III above may be prepared by contacting, in the presence of an acid acceptor, a dihydric phenol selected from the class consisting of

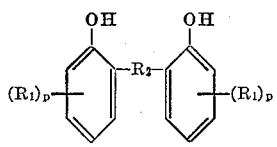

and

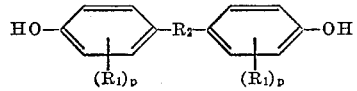

where $R_1$, $R_2$ and $p$ have the meanings given above, with a carbonyl halide to provide a reaction mixture containing a cyclic carbonate polymer of the formula

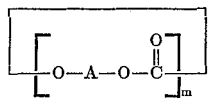

where $A$ and $m$ have the meanings given above, and separating the cyclic carbonate polymer from the reaction mixture.

The carbonyl halide employed in the preparation of the cyclic carbonate polymers of the invention may be carbonyl chloride or carbonyl bromide although carbonyl chloride (phosgene) is preferred, due primarily to its availability. The molar quantity of carbonyl halide used should be substantially equal to the molar quantity of the dihydric phenol to be reacted.

The reaction between a carbonyl halide and the dihydric phenol to provide a cyclic carbonate polymer in accordance with the invention may be successfully carried out at temperatures ranging from values below about $-10°$ C. to values above about $75°$ C. However, higher yields of the desired cyclic product may be obtained by maintaining the temperature of reaction below the reflux temperature (at atmospheric pressure) of the reaction mixture, and preferably below $20°$C.

In general, the acid acceptor useful in the practice of the invention may be organic or inorganic in nature, although the organic bases are preferred. Examples of such acid acceptors are aliphatic tertiary amines, such as, for example, trimethylamine; triethylamine; tripropylamine; as well as aromatic tertiary amines such as, for example, triphenylamine; N,N-dimethylaniline; and N,N-dimethyl-p-nitroaniline. Included also are the heterocyclic tertiary amines such as, for example, pyridine; picoline; pyridazine, pyrimidine, pyrazine, quinoline; and isoquinoline. Mixtures of two or more of such tertiary amines may also be used.

In many instances, the tertiary amine employed may act as a solvent for the reactants, as in the case of pyridine, for example. In the event the amine does not act in this capacity, a common solvent for the reactants which is inert in the sense that it does not enter into the reaction, may be used. Examples of such solvents are methylene chloride, ethylene dichloride, propylene dichloride and chlorobenzene. Although the quantity of solvent used may vary within wide limits, it has been discovered that higher yields of the desired polymeric cyclic carbonate may be obtained when the weight ratio of the dihydric phenol to solvent is less than about 0.2, and preferably less than about 0.05.

In the case where a cyclic carbonate dimer is produced, i.e., where the dihydric phenol employed in the reaction with the carbonyl halide conforms to the formula

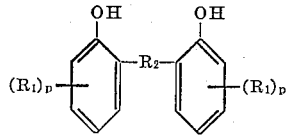

where $R_1$, $R_2$ and $p$ all have the meanings given above, the reaction mixture at the termination of the reaction will contain, in addition to the desired cyclic dimeric carbonate, a cyclic carbonate monomer of the formula

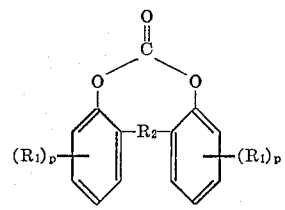

as well as a linear polymer containing recurring structural units of the formula

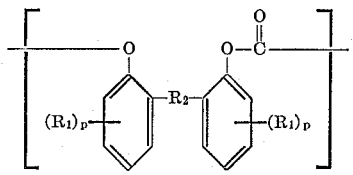

Separation of the cyclic monomer and dimer from this reaction mixture may be accomplished in any number of ways, as for example, by treating the reaction mixture with an inert organic solvent in which the cyclic dimer and monomer are soluble, but in which the linear polymer is insoluble. Examples of suitable solvents for use in this connection are acetone, diethylether and carbon disulfide. Addition of such solvents to the reaction mixture will cause the linear polymer to precipitate from the solution containing the monomer and dimer. The resulting solution may be separated from the solid linear polymer by filtration, or centrifugation, for example. The dimer and trimer may then be removed from solution by evaporating the solvent, for instance, to provide a solid mixture of the cyclic materials. Subsequently, the dimer may be isolated from the monomer by gradually heating the solid mixture under vacuum at a temperature of from about $90°$ C. to about $150°$ C. to sublime the monomeric carbonate. The resulting sublimation residue, which is substantially nonvolatile under these conditions comprises the desired impure cyclic carbonate dimer.

Alternatively, the cyclic dimer may be separated from the reaction mixture by simply evaporating the reaction mixture to dryness and extracting the cyclic carbonates (monomer and dimer) from the solid residue with any one of the above solvents in which the cyclic materials are soluble but in which the linear polymer is insoluble. The resulting solution of the cyclic materials may then be evaporated to dryness and the dimer isolated from the monomers by sublimation.

In the case where a cyclic trimeric carbonate is prepared, i.e., where the dihydric phenol employed in the reaction with the carbonyl halide conforms to the formula

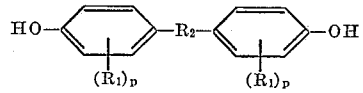

where $R_1$, $R_2$ and $p$ all have the meanings given above, the reaction mixture at the termination of the reaction will contain, in addition to the desired cyclic trimer, a linear polymer containing recurring structural units of the formula

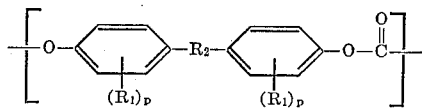

Separation of the trimer from the reaction mixture may be accomplished in a number of ways as, for example, by treating the reaction mixture with an inert organic solvent in which the cyclic trimer is soluble but in which the linear polymer is insoluble. Generally speaking, the solvents employed in this capacity may be the same solvents used in the separation of the cyclic dimeric material from the reaction mixture as mentioned above. As in the case of the cyclic dimer separation, addition of such an organic solvent with the reaction mixture will cause the linear polymer to precipitate. The resulting solution may be separated from the solid linear polymer by filtration or centrifugation, for example. The cyclic carbonate trimer may then be isolated from the solution by evaporation of the solvent to provide a solid residue comprising the cyclic trimeric carbonate material.

As will be appreciated by those skilled in the art, the cyclic trimeric carbonate may also be separated from the reaction mixture by evaporating the reaction mixture to dryness, and extracting the cyclic trimeric carbonate with any of the aforementioned solvents in which the trimer is soluble but in which the linear polymer is insoluble. Isolation of the cyclic trimer from solution may then be accomplished by evaporation of the solvent to provide a solid residue of the cyclic trimeric carbonate material.

I have also discovered that the cyclic aromatic carbonates falling within the scope of Formula III above may be polymerized to provide linear, high molecular weight aromatic polycarbonate resins of the type which have achieved wide acceptance in the plastics industry. Such linear high molecular weight polymers may be prepared in accordance with my invention by heating the cyclic aromatic carbonates of Formula III for a period of time, varying inversely with the temperature, until a high molecular weight linear polymer is produced. A catalytic amount of a basic material may be added to accelerate the speed of the polymerization and to reduce the temperature at which the polymerization is initiated. Such addition of catalyst is by no means necessary, however, since unless active means are taken to (1) completely sterilize the equipment in which the cyclic materials are heated (as for example glass or metal beakers), (2) purify the cyclic material by repeated recrystallization techniques, and (3) conduct the polymerization in a closed system i.e., in an inert atmosphere, the presence of even minute amounts of any impurity (such as traces of atmospheric moisture, unreacted bis-phenol occluded to the surface of the cyclic material, or even the base or metal oxide present on the surface of the vessel in which polymerization is to be effected) will be sufficient to initiate the polymerization of the cyclic materials. In this connection, I have found that the cyclic dimeric carbonates falling within the scope of Formula III above are more stable than the cyclic trimeric materials.

Examples of the basic materials which may be used to increase the rate at which polymerization may be initiated are the alkali metals, such as sodium, potassium rubidium, cesium; alkali metal hydroxides, such as sodium hydroxide, potassium hydroxide; alkali metal carbonates, such as sodium carbonate, potassium carbonate; alkali metal alkoxides, such as sodium methoxide, potassium ethoxide; alkali metal aryloxides, such as sodium phenate, dipotassium bisphenate; quaternary ammonium hydroxides, such as tetramethylammonium hydroxide, cetyl triethylammonium hydroxide, tetra n-heptyl ammonium hydroxide, tetra n-heptyl ammonium hydroxide, tetraethyl ammonium hydroxide; organometallics such as phenyl lithium, butyl lithium, and Grignard reagents, such as phenyl magnesium bromide.

In general, the polymerization of the cyclic carbonate dimers and trimers to linear aromatic carbonate polymers may be conducted either in a fusion cook or in a solvent system. As will be appreciated by those skilled in the art, it is possible to employ a cyclic dimer and trimer in combination with one another, or in combination with one or more different aromatic cyclic monomers of the type falling within the scope of Formula I above (in either polymerization technique), in the event a carbonate copolymer rather than a homopolymer is desired.

In the event the fusion cook technique is employed, temperatures as high as 350° C. may be required to initiate the polymerization reaction, depending upon the particular cyclic carbonate and catalyst that are used. On the other hand, should the reaction be conducted in a solvent system, polymerization may be successfully initiated at temperatures as low as 100° C. or lower, although temperatures ranging from about 110° C. to the temperature at which the solvent refluxes (at atmospheric pressure) are generally preferred, since the maximum degree of polymerization of the cyclic carbonates into linear form has been found to occur within that temperature range.

The reaction time at any given temperature will vary with each particular cyclic carbonate, the type and amount of catalyst, if any, that is used, and the amount, if any, of solvent present. Generally speaking, the polymerization reaction is permitted to continue at a fixed temperature until the viscosity of the resulting polymer or polymer solution reaches a maximum, thus insuring as complete a degree of polymerization as possible. In the case of the fusion cook, heating for a period of from a few minutes to a few hours will often suffice, and the increase in viscosity may be observed visually. Should a solvent system be employed, the viscosity of the polymer will reach a specific maximum after a period of time which again may last from but a few minutes to several hours, depending again upon the specific cyclic carbonate used and the amount of solvent and catalyst employed. Continued heating of the formed polymer after the maximum viscosity is attained will only tend to decrease this value. The period of heating any given cyclic at a fixed temperature until this maximum is reached may be ascertained easily by periodic tests made on the viscosity of the polymer formed. Generally, a period of heating of from less than one hour to four hours or more will be sufficient to achieve this maximum value.

Any organic solvent, inert in the sense that it does not enter into the polymerization reaction and preferably one in which the resulting linear polymer is soluble, may be employed. Examples of suitable solvents are: chlorinated biphenyls containing from 1 to 10 chlorine atoms on the aryl nucleus; chlorinated diphenyl ethers containing from 1 to 10 chlorine atoms on the aryl nucleus; diphenyl ether, ethylene dichloride, propylene dichloride, chlorobenzene, chloroform, pyridine, and methylene chloride. The catalytic amount (i.e., the amount sufficient to initiate polymerization) of catalyst used may also vary within a wide range, depending upon the temperature of reaction, the amount of solvent employed, and the particular cyclic carbonate which is to be polymerized. Satisfactory results have been obtained by employing as little as 0.001% by weight of the catalyst, based upon the weight of the cyclic carbonate to be polymerized. Generally, however, amounts varying from 0.01% to about 3% by weight are advantageously used. Although the catalyst may be added in amounts greater than 3%, such addition is neither necessary nor practical, since it tends to reduce the molecular weight of the polymer formed and to contaminate the resin product which is obtained. As will be appreciated by those skilled in the art, molecular weight regulators may be added to the cyclic dimer or trimer in either polymerization technique. Examples of such regulators are monofunctional phenols, i.e., phenol, p-tertiary butyl phenol; monofunctional organic acids, i.e., benzoic acid, acetic acid; and monofunctional alcohols, i.e., methanol, ethanol.

In order that those skilled in the art may better understood how the present invention may be practiced, the following examples are given by way of illustration and not by way of limitation. All parts and percentages are by weight unless otherwise noted. Values within ±10% of the calculated molecular weight of any particular cyclic carbonate were deemed to be within the acceptable range of experimental error involved in such molecular weight determinations.

*Example 1*

114 parts 2,2' - dihydroxy - 5,5' - dimethyldiphenylmethane were dissolved in 2,280 parts methylene chloride (5% solids based on $CH_2Cl_2$) and 118 parts pyridine. The stirred solution was cooled in an ice bath to 0°–5° C. and phosgene bubbled in at a rate of one part per minute until the reaction was complete (55 minutes). The reaction mixture was washed first with an HCl-water mixture to remove pyridine, followed by several water washes to remove pyridine hydrochloride. The methylene chloride solution was dried over anhydrous calcium chloride and evaporated to dryness in an air stream. The residual solid was slurried with carbon tetrachloride and the solution separated from the solid phase by filtration. The solids were set aside, the $CCl_4$ solution evaporated to dryness and the resulting residue re-slurried with carbon tetrachloride. This second solid residue was combined with the first residue, and the solids mixture heated at reduced pressure. The cyclic monomeric carbonate was carefully sublimed at 90–150° C. at less than 1 mm. of mercury. After all the monomeric cyclic carbonate was sublimed the residue was recrystallized twice from benzene and once from carbon disulfide to yield a white crystalline solid, micromelting point 274.5–275.0° C. on Kofler hot stage between cover glasses washed in boiling hydrochloric acid. Infrared analysis showed an absence of hydroxyl and a strong carbonate absorption. The following analytical data confirmed the identification of this solid as the dimeric cyclic carbonate.

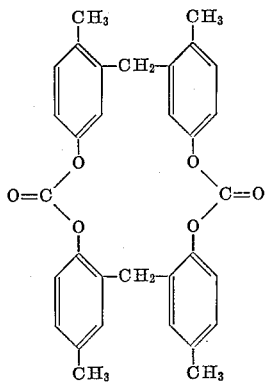

|  | Found | Calculated |
| --- | --- | --- |
| Hydrogen (percent) | 5.68 | 5.55. |
| Carbon (percent) | 75.78 | 75.57. |
| Molecular Weight | {[1] 542<br>[2] 472} | 508 (as dimer). |

[1] Isothermal distillation.
[2] Boiling Point Elevation—$CHCl_3$.

*Example 2*

Thirty parts of 2,2-(4,4'-dihydroxydiphenyl) propane were dissolved in 3000 parts methylene chloride (1% solids based on methylene chloride) and 40 parts pyridine. Phosgene was bubbled into the stirred solution at a rate of 0.3 part per minute for one hour. The reaction mixture was washed first with an HCl-water mixture to remove pyridine, followed by several water washes to remove pyridine hydrochloride. The methylene chloride solution was dried over anhydrous calcium chloride and evaporated to dryness in an air stream. The residual solid was extracted five times with portions (100 parts) of carbon disulfide by heating the carbon disulfide-powder mixture to reflux for 30 minutes for each extraction. The extracts were combined and evaporated to dryness. The white powdery residue was recrystallized twice from carbon disulfide, once from benzene and once from carbon tetrachloride to yield a white crystalline solid, melting point 335–340° C. (with appreciable polymerization) between acid washed cover glasses. Infrared analysis showed an absence of hydroxyl and a strong carbonate absorption for the crystalline solid. The following analytical data confirmed the identification of this solid as the trimeric cyclic carbonate.

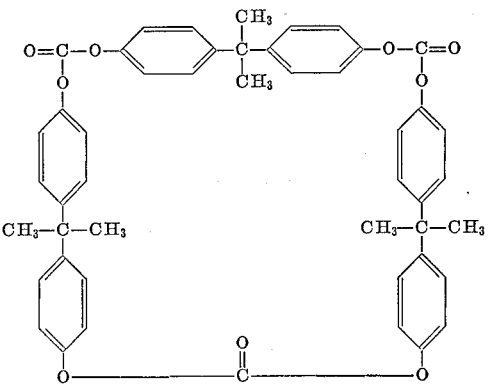

|  | Found | Calculated |
| --- | --- | --- |
| Carbon (percent) | 75.60 | 75.57 |
| Hydrogen (percent) | 5.52 | 5.55 |
| Molecular Weight | {[1] 756<br>810 (osmometer)<br>[2] 691} | 763 (as trimer). |

[1] Isothermal distillation.
[2] Boiling Point Elevation—$CHCl_3$.

*Example 3*

114 parts 2,2-(4,4'-dihydroxydiphenyl) propane were dissolved in 737 parts of methylene chloride and 88 parts pyridine. Phosgene was bubbled into the stirred solution at a rate of 0.82 part per minute for one hour. The methylene chloride solution was diluted with an additional 400 parts methylene chloride and washed with hydrochloric acid and water to remove pyridine and pyridine hydrochloride. The linear polyer was precipitated by adding twice the volume of acetone to the methylene chloride solution with vigorous agitation. The precipitated solid was filtered off and the clear precipitation liquor evaporated to dryness. The solid remaining after the solvents were evaporated was extracted with hot carbon disulfide several times to yield a carbon disulfide soluble portion which was recrystallized from carbon disulfide and carbon tetrachloride to yield a crystalline solid identical to that obtained in Example 2 and identified as the cyclic trimeric carbonate of 2,2-(4,4'-dihydroxydiphenyl) propane.

*Example 4*

0.25 part of the cyclic dimeric carbonate of Example 1 was placed in a glass tube and melted to a clear, light yellow liquid in a bath maintained at 280° C. When the tube was removed from the bath and allowed to cool, the melt crystallized with no evidence of polymer formation. When the tube was replaced in the hot bath, the dimer remelted. A minute quantity of anhydrous potassium carbonate (approximately .001%) was introduced to the hot melt and a dramatic change was noted. The fluid melt gradually increased in viscosity and after 15 minutes' heating was quite viscous so that fibers could be drawn from the melt. The viscous polymer was allowed to cool and dissolve in methylene chloride. Part of the methylene chloride solution was precipitated in methanol to yield a fibrous polymer and part was cast on a glass plate to yield a clear, flexible film.

Example 5

One gram of the cyclic trimeric carbonate of 2,2-(4,4'-dihydroxydiphenyl) propane described in Example 2 was piled in the center of a small aluminum weighing cup and placed on a hot plate with a surface temperature of 600° F. The surface temperature was raised gradually to 660° F. over a ten minute period and the pile of solid trimer melted completely to a clear yellow viscous liquid. As soon as the crystalline solid was completely melted the cup was removed from the hot plate and allowed to cool. On cooling the melt remained clear and became tough and ductile. It was soluble in methylene chloride and after precipitation from solution with acetone, the dried polymer was found to have a reduced viscosity of 1.84 at 30° C. in dioxane at 0.4 g./100 ml. concentration. A methylene chloride solution of this polymer was cast into a clear tough film. The infrared analysis of this polymer showed it to be essentially identical to the linear polymer obtained from the direct phosgenation of 2,2-(4,4'-dihydroxydiphenyl) propane in methylene chloride-pyridine solution.

Example 6

This example clearly points out the catalytic effect of minute quantities of basic materials on the thermal polymerization of cyclic carbonate polymers. When a sample (0.1 gram) of the purified cyclic dimeric 2,2'-(5,5'-dimethyldiphenylmethane) carbonate was placed between ordinary microscope slides, the melting range was determined to be 249–257° C. After cooling, the resulting glassy polymer was found to have a reduced viscosity of 0.25 at 30° C. in dioxane at 0.4 g./100 ml. concentration. When this same procedure was used with microscope slides which had been boiled in concentrated hydrochloric acid and washed thoroughly with water to remove traces of surface base, the melting range was determined to be 272–273° C. and the resulting melt found to have a reduced viscosity of 0.08 at 30° C. in dioxane at 0.4 g./100 ml. concentration.

Example 7

0.25 part of the cyclic trimeric carbonate described in Example 2 was dissolved in 2 parts of diphenyl ether at 210–230° C. When approximately 0.01% (based on weight of trimer) anhydrous potassium carbonate was added, a slow but steady increase in the solution viscosity was noted. After heating for 30 minutes at 210–230° C., the viscous solution was poured into acetone to yield a white fibrous polymer which was soluble in methylene chloride and could be cast into a clear film from methylene chloride solution.

Example 8

0.25 part of the cyclic trimeric carbonate was dissolved in one part of chlorobenzene at 110–120° C. Approximately 0.01% (based on weight of trimer) solid potassium hydroxide was added to the heated solution. Rapid polymerization was noted as swollen polymer particles appeared. After 10 minutes the solution was diluted with one part chlorobenzene and the polymerization allowed to proceed for an additional 15 minutes at 110–120° C. At this point the viscous solution was poured into 100 parts of acetone to precipitate the polymer as a fibrous mass. The polymer was filtered off and after drying had a reduced viscosity of 3.83 at 30° C. in dioxane at 0.4 g./100 ml. concentration.

Example 9

One part of the cyclic trimeric carbonate described in Example 2 was mixed with one part of the cyclic dimeric carbonate described in Example 1 and 0.01% anhydrous potassium carbonate. This mixture was heated in a sealed tube in a metal bath at temperatures between 600–660° F. for 45 minutes. On cooling, a clear tough glass was obtained which was completely soluble in methylene chloride and was cast from methylene chloride into a clear, tough, colorless film.

From the foregoing examples, it will be appreciated that the aromatic cyclic carbonate dimers and trimers of the present invention afford a simplified process for preparing high molecular weight aromatic polycarbonate resins. Since the polymerization of the cyclic carbonate dimers and trimers to form high molecular weight polycarbonate resins neither requires the use of a toxic carbonyl halide, nor results in the evolution of a corrosive gas, such as HCl, the polycarbonate resins may be polymerized from the cyclic carbonates at their place of use. Accordingly, large and intricate castings of polycarbonate resin may be prepared by polymerizing a cyclic carbonate dimer or trimer or mixture of such dimers and trimers in situ at the particular installations requiring such resin castings. In addition, the cyclic carbonates of the invention may be employed as potting compounds and in the production of coatings and films by in situ polymerization techniques.

The polycarbonate resins prepared from the cyclic carbonate dimers and trimers of the invention have utility in the same applications as previously known aromatic carbonate polymers. For example, they are useful in the manufacture of films, fibers, molded or extruded parts, and in the preparation of surface coatings for use in structural, decorative, and electrical applications.

What I claim as new and desire to secure by Letters Patent of the United States is:

1. A cyclic aromatic carbonate polymer having the structure

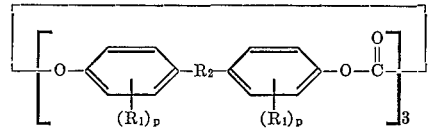

where
$R_1$ is selected from the class consisting of halogen and alkyl;
$R_2$ is an alkylidene group; and
$p$ is a whole number from 0 to 2.

2. A cyclic aromatic carbonate polymer having the structure

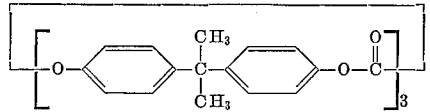

3. A process for preparing a cyclic carbonate polymer which comprises contacting, in the presence of an acid acceptor, a dihydric phenol of the formula

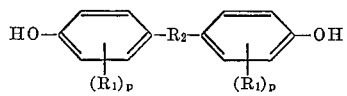

where
$R_1$ is selected from the class consisting of halogen and alkyl;
$R_2$ is an alkylidene group,
$p$ is a whole number from 0 to 2,
with a carbonyl halide to provide a reaction mixture containing a cyclic carbonate polymer of the formula

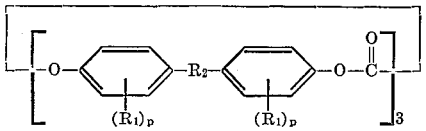

and separating the cyclic carbonate polymer from the reaction mixture.

4. The process of claim 3 wherein the carbonyl halide is phosgene.

References Cited by the Examiner

UNITED STATES PATENTS 3,021,305  2/1962  Goldberg _____ 260—47 X
3,155,683  11/1964  Moody _____ 260—47 X

FOREIGN PATENTS 620,620  8/1962  Belgium.

OTHER REFERENCES

Schnell et al.: "Makromolekulare Chemie," vol. 57 (October 1962), pages 1–11.

SAMUEL H. BLECH, *Primary Examiner.*